United States Patent [19]

Kingery

[11] 4,440,385
[45] Apr. 3, 1984

[54] CUTTING BOARD WITH FUNNELING EFFECT

[76] Inventor: Dan W. Kingery, 408 S. 7th #3, Renton, Wash. 98055

[21] Appl. No.: 324,153

[22] Filed: Nov. 23, 1981

[51] Int. Cl.³ .............................................. B23Q 3/00
[52] U.S. Cl. .................................. 269/13; 269/289 R; 269/302.1
[58] Field of Search .......................... 15/257.1–257.7; 294/49–50, 7; 269/302.1, 289 R, 303, 304, 306, 315, 3, 4, 6, 13

[56] References Cited

U.S. PATENT DOCUMENTS

| | | |
|---|---|---|
| 161,596 | 1/1851 | Russ . |
| 196,248 | 9/1863 | Quistgaard . |
| 200,970 | 4/1865 | Miller . |
| 239,688 | 4/1876 | Doman . |
| 870,447 | 11/1907 | Lyons ................................ 15/257.2 |
| 2,070,928 | 2/1937 | Schroeder ............................ 294/49 |
| 2,840,013 | 6/1958 | Seils ..................................... 294/49 |
| 2,935,107 | 5/1960 | Bertelsen et al. . |
| 3,026,553 | 4/1962 | Whitmire ........................... 15/257.4 |
| 3,371,694 | 3/1968 | Miller . |
| 4,017,063 | 4/1977 | Brusich . |
| 4,273,318 | 6/1981 | Crowhurst . |

Primary Examiner—Robert C. Watson
Attorney, Agent, or Firm—Delbert J. Barnard; Eugene O. Heberer

[57] ABSTRACT

The cutting board (10) has an upper surface (16) for cutting and has an opposite lower surface (18) on which the board is adapted to be supported during cutting. A handle (40) is operative to lift the board cutting portion (12). There are one (196) or more elongated rod members (52, 54) adapted to fit within recesses (198) (32, 34), extending longitudinally in board portion (12) to pivot recess (202) (36), transverse with respect to the rods (52, 54). Recesses (32, 34) (202) have varying depths, with the greatest depth at the inner end of the board portion (12). The recesses are lessened in depth toward the pivot recess (202) (36). Extending transversely from the rods (196) (52, 54) are pivots (204) (56, 58), adapted to rotate in the recess (202) (36). The pivots are retained in the recess (36) by means of keepers (64). When the board is lifted by the handle (164) (40), the weight of the board causes it to be lowered with respect to the rods and the upper surfaces of the recesses move onto the upper surfaces of the respective rods as the board rotates on the pivots. The end of the cutting portion (12) makes contact with a fence or wall (30) attached to the handle to prevent cut particles from falling between the handle structure and the cutting board structure. The board may be tilted by the handle and the cut material funneled and/or scraped therefrom into a container.

24 Claims, 13 Drawing Figures

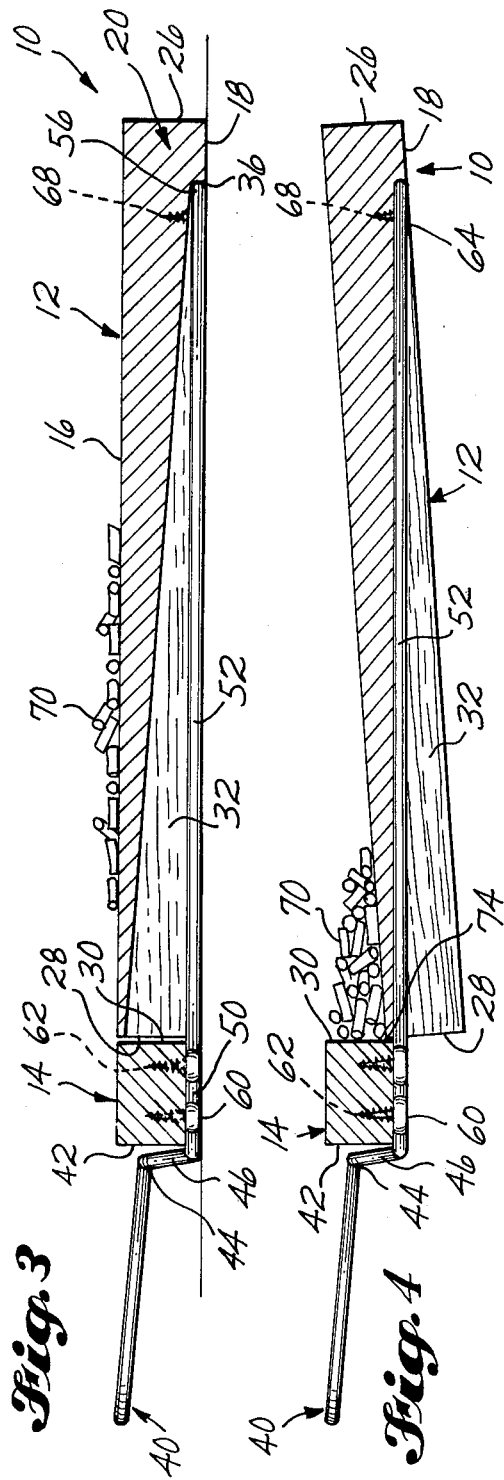
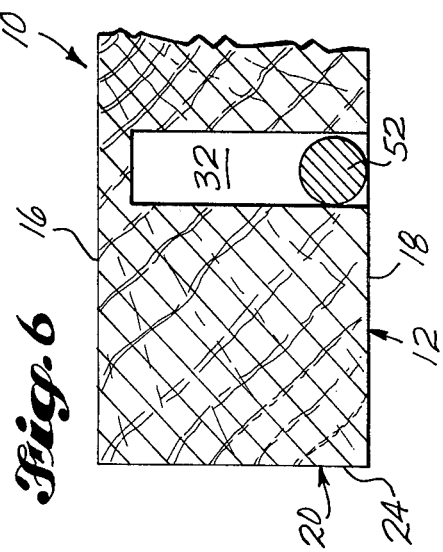
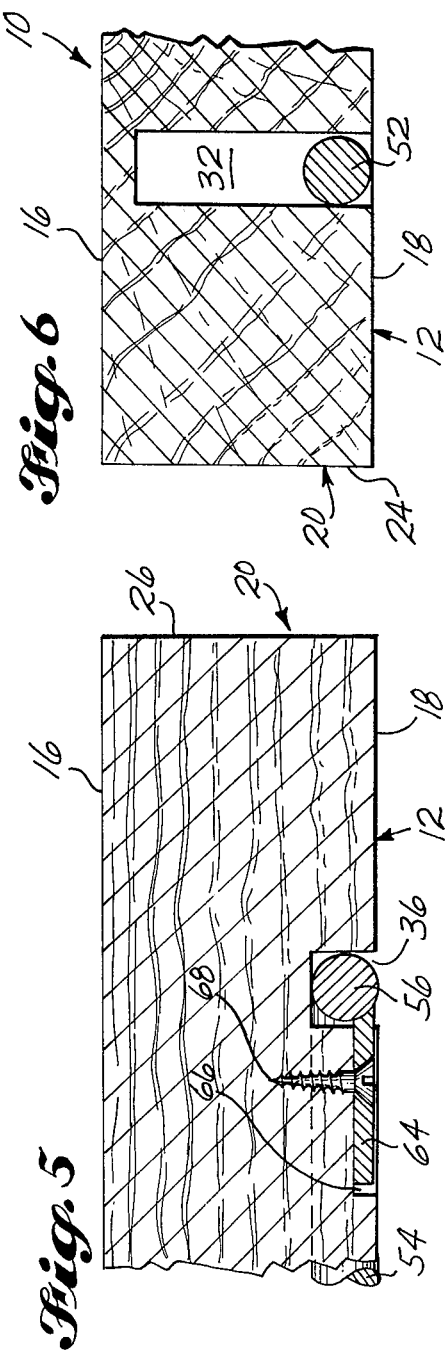

CUTTING BOARD WITH FUNNELING EFFECT

DESCRIPTION

1. Technical Field

The invention relates to a cutting board of a type generally used for cutting or chopping food, and in which a wall is provided for aiding in removing cut material from the board and into a container.

2. Background Art

Prior art food cutting boards have been provided having means for aiding in removing the food from the board after it has been cut. A search of the patent literature disclosed a number of boards illustrative of the foregoing. For example, U.S. Pat. No. 2,935,107 illustrates a foldable board which is normally spring biased into a flat position for cutting, and which after cutting, is foldable along centrally positioned edges against the bias of the springs, fitted within the board and extending transversely to the folding edges. Australian Patent No. 241,151 discloses a bread board having an upstanding wall with at least one inclined edge thereof with the upper end of the edge projecting beyond the lower end of the edge to form a guide for the knife during the slicing of the loaf. The inclined edge of the board overcomes the tendency to push the knife away from the end of the wall and protects the end of the wall from being damaged by cutting because it recedes from the direction in which the knife is cutting.

U.S. Pat. No. 3,371,694 discloses a cutting board having a scoop attached thereto. The cut material is thus adapted to be transferred from the board to the scoop which permits further transfer to a container. U.S. Design Pat. No. 200,970 discloses the same structure as the above discussed utility patent.

U.S. Pat. No. 4,273,318 discloses a food chopping board having a detachable tray to which the cut or chopped food is transferable.

The following patents disclose cutting boards which are cumulative to those described above:

U.S. Pat. No. 4,017,063; U.S. Design Pat. No. 161,596; U.S. Design Pat. No. 196,248; U.S. Design Pat. No. 239,688.

DISCLOSURE OF THE INVENTION

The invention is a cutting and chopping board, particularly for cutting food in a manner as may be desirable and/or necessary in gourmet cooking. The board has a handle connected to a transverse block portion having an inwardly facing, normally transverse wall. The board is connected to the block for relative raising and lowering by pivotal movement with a pivot point being relatively remote from the transverse block at a lower part of the board.

An end of the board is spaced adjacent the transverse wall and when the board is supported on its lower surface, an upper cutting surface is substantially at the same level as the upper surface of the transverse block. It is in this supported position that the cutting is normally performed on the cutting surface of the board.

One or more elongated members or rods are secured adjacent the lower surface of the transverse block. The rod or rods extend into recesses or slots in the lower surface of the board below the cutting surface, and terminate remotely from the transverse block in the pivot means which also extend into recesses in the lower surface of the board. The rod or rods are directly or indirectly connected to the handle and extend along the lower surface of the cutting board when the board is supported on a typical table surface on which the cutting operation is accomplished. As stated, in this position, the cutting surface of the board is at substantially the same level as the upper surface of the block and approximately at the upper level of the handle.

When the cutting operation is completed, the board is lifted by the handle and the board weight causes it to rotate on the pivot and be lowered with respect to the handle and the block. The pivot remains at substantially the same level with respect to the lower part of the block and the handle but the end of the board adjacent the block moves to a lower portion of the block and into contact therewith. In this position, the transverse wall of the block forms a fence along which cut or chopped food can be moved as the cut material is being moved off of the board into a container, typically with a scraping knife that was used for the cutting. During the removal of the food, the board and the block can be tilted by rotating the handle so that the food will be moved off the board by gravity in addition to the scraping action of the knife along the board and the fence, formed by the transverse wall of the block.

It is clear from the foregoing that the invention provides the advantage of being able to pour or funnel chopped material from a chopping board without the risk of spilling the material off the end. That is, a fence is provided for moving the material there along as the food is moved into a cooking container, for example.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is a partially cross-sectional view taken along the line 3—3 in FIG. 1;

FIG. 4 is a view similar to FIG. 3, illustrating the operation of the board when it is lifted by the handle off of a supporting surface;

FIG. 5 is a cross-sectional view of a pivot and its keeper taken along the line 5—5 in FIG. 2;

FIG. 6 is a fragmentary cross-sectional view taken along the line 6—6 in FIG. 1;

BEST MODE FOR CARRYING OUT THE INVENTION

Figure 1:
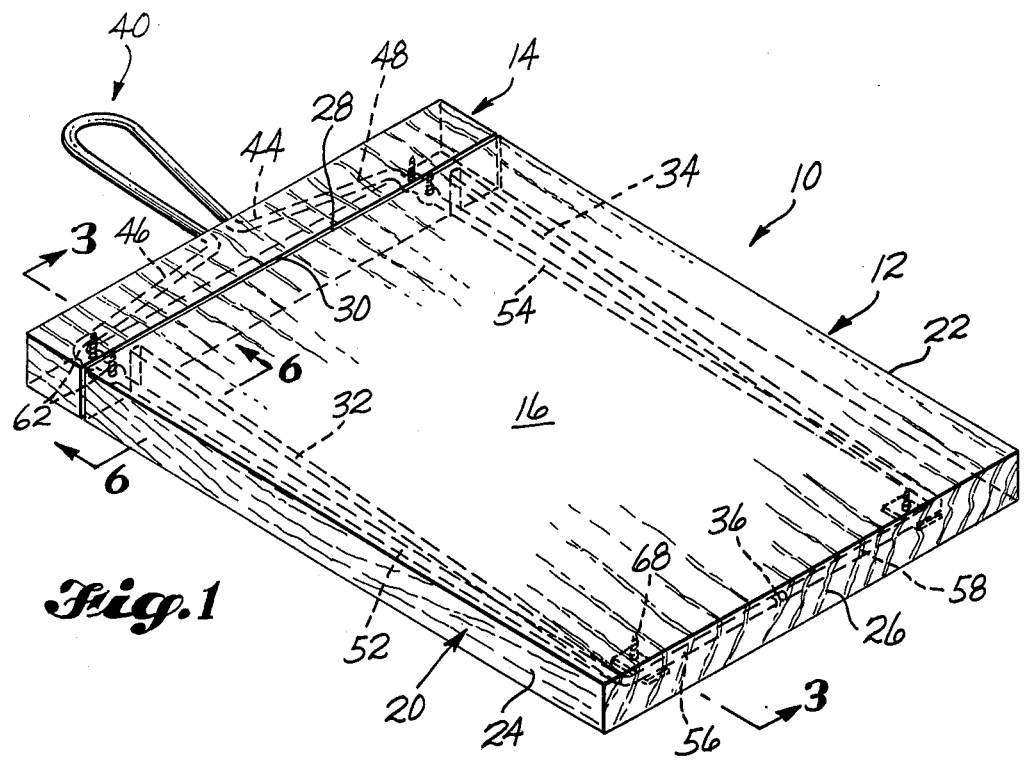
FIG. 1 is an isometric view of the invention as it would appear from above, supported on a table in position for operation.

Referring again to the drawings, FIGS. 1–6, the cutting board, according to the invention, is generally designated as 10. The board 10 is comprised of a cutting board portion 12 and a transverse block portion 14 which forms a funneling or fencing device for use while the cut material is being moved into a container. The cutting portion 12 is generally rectangular and has an upper cutting surface 16 and a lower surface 18 on which it is adapted to be supported during the cutting operation. The surfaces 16 and 18 are spaced by a relatively thick wall, generally indicated as 20, having two side surfaces 22 and 24, a remote end surface 26 and an internal surface 28, adjacent a fence or funneling surface 30 of the transverse block 14.

The lower surface 18 of the wall 20 has three recesses 32, 34 and 36. The recesses 32 and 34 are of identical slot configuration, having openings through the wall surface 28 and having varying straight line depths, the greatest depths being at the openings in the surface 28, and decreasing with respect to the lower surface 18 to the most shallow depth at transverse recess 36, extending between the slots 32 and 34. The transverse or pivot recess 36 is of constant depth.

Extending outwardly from the transverse block 14 is a rod-formed handle 40, its outer end being slightly above the level of the board's upper surfaces. The handle declines inwardly toward outer surface 42 of the block 14, FIGS. 3 and 4. From inner end 44 of the handle, extend opposite downwardly and outwardly rod portions 46 and 48, terminating at under surface 50 of the block 14. At substantial right angles to the plan direction of the portions 46 and 48 are elongated rod members 52 and 54 which terminate in transverse pivot forming rod members 56 and 58, respectively, FIG. 2. The rod members 52 and 54 are substantially parallel to fit within the recesses 32 and 34, respectively. The rod members 52 and 54, inlaid with respect to the surface 50 in the block 14, are flattened and widened to have screw holes 60 to receive flat headed screws 62 and which are threaded into the block 14 so as to secure the handle, the elongated members 52 and 54 and the transverse members 56 and 58 to the block 14.

Figure 2:
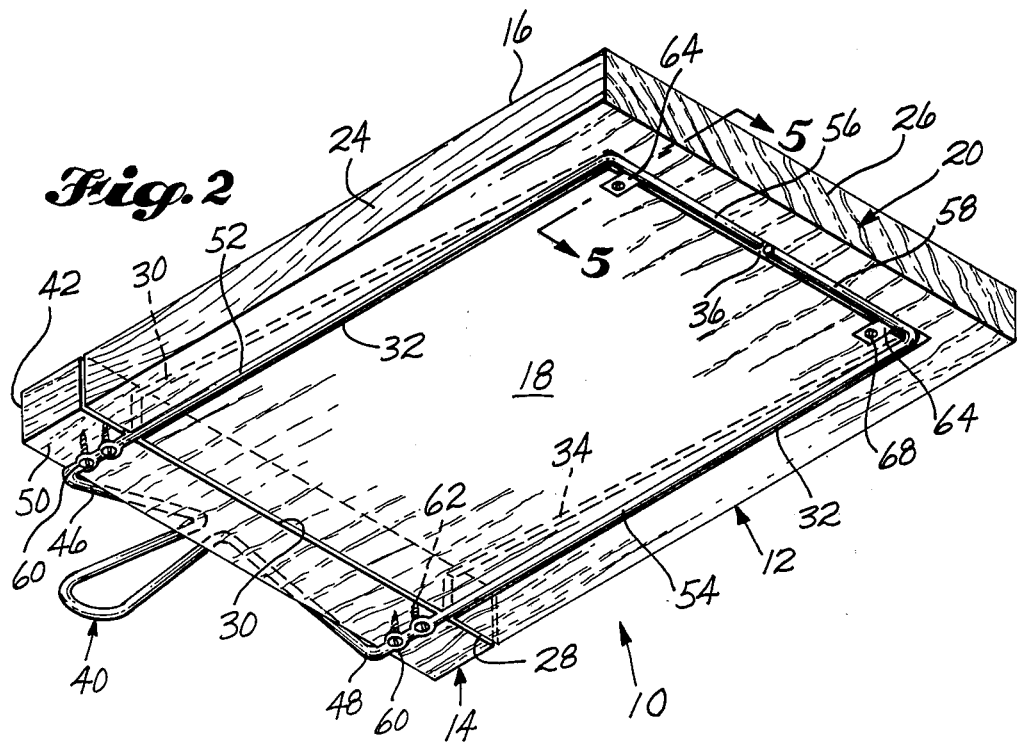
FIG. 2 is an isometric view of the board, shown in FIG. 1, taken from the bottom.

The transverse pivot portions 56 and 58 fit within the groove 36, FIGS. 2, 3, 5, and are secured therein by keepers 64, each fitting within a cutaway portion 66 in lower surface 18 of the cutting board 12 and secured therein by a flat headed wood screw 68. The keepers 64 support the pivot members 56 and 58 slightly above the lower surface 18 of the cutting block, the pivots being rotatable on the keeper surface and on the surfaces of the groove 36.

For operation, the board 10 is supported on a flat table surface, as shown in FIG. 3, the lower board surface 18 being in contact with the table and portions of the elongated members under the block 14 also being in contact with the table. For the most part, the elongated members 52 and 54, within the recesses of the board, and the pivots 56 and 58 are slightly above the table as indicated in FIGS. 5 and 6. After food or other material 70 has been chopped as indicated in FIG. 3, it is ready for removal from the cutting surface 16 of the board 12.

To remove the cut material 70, the handle 46 is grasped and moved upwardly so as to lift the block 14, the rods 52 and 54 and the pivots 56 and 58. When this occurs, the weight of the board 12 causes it to be lowered on the rods 52 and 54 and rotated on the pivots 56 and 58, the rods 52 and 54 moving relatively upwardly in the recesses 32 and 34, respectively. This movement tends to put the cut material 70 in the position shown in FIG. 4 with the material 70 partially against the wall 30 of the block 14, the wall 30 forming a fence for aid in scraping or funneling the material from the board surface 16. The material 70 can easily be scraped with the handle held in the horizontal position, as shown in FIG. 4, or with the handle tilted so as to tend to pour or funnel the material off the board 16 into a container.

As shown in FIG. 3, the wall surfaces 28 and 30 are spaced, and when the cutting board 12 is lowered on the rods, the upper edge of the adjacent end 28 makes contact at 74 on the surface 30 to prevent the cut material from falling between the block 14 and the board 12. As the cutting board moves downwardly on the rods, the rods make contact with the upper surfaces of the recesses 32 and 34. From the foregoing description, the benefit of having the varying depths in the recesses 32 and 34 is realized. That is, the mere lifting of the board off the supporting surface actuates the board for the operation for funneling or pouring and scraping the cut material into a container.

The cutting surface 16 may be from 12 to 14 inches in length and 8 to 10 inches in width for a typical home use. The thickness of the wall 20 is about 1¼", and the fall of the surface 16 to where the board makes a contact at 74 with the block 14, and where the upper surface of the recesses are supported on the elongated rods, would be approximately ¾". When the board 10 would be made of a hard wood, the recesses 32, 34 and 36 would be typically cut in slot configuration by means of a router. Where the board would be made of plastic, the slots could be formed in a mold. Further, the entire bottom surface 18 between the elongated external surfaces of the recesses 32 and 34 could be omitted.

Figure 7:
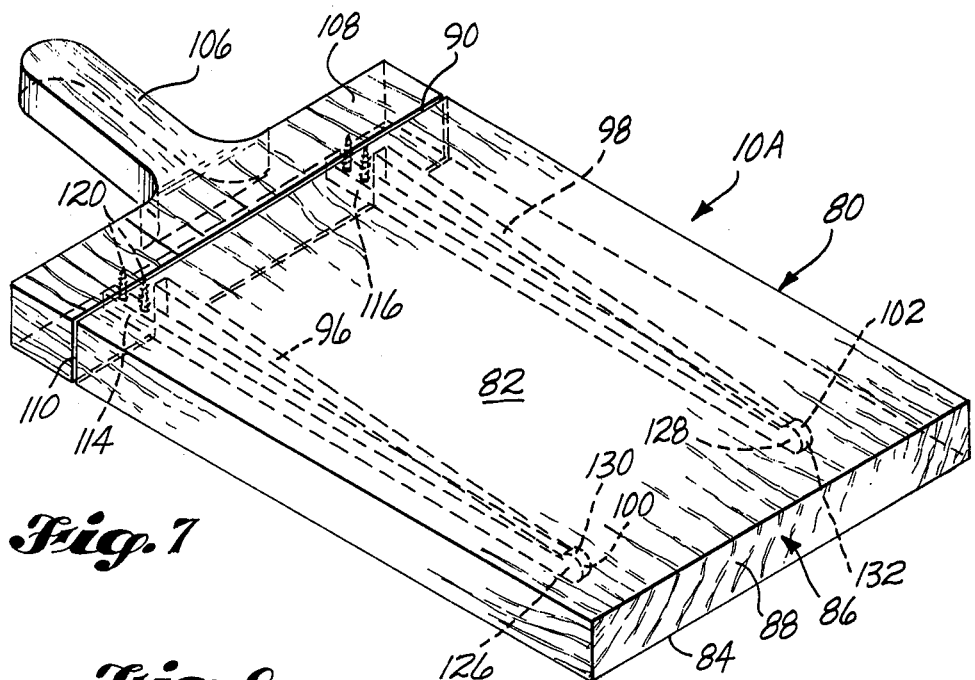
FIG. 7 is an isometric view illustrating another embodiment of the invention.
Figure 8:
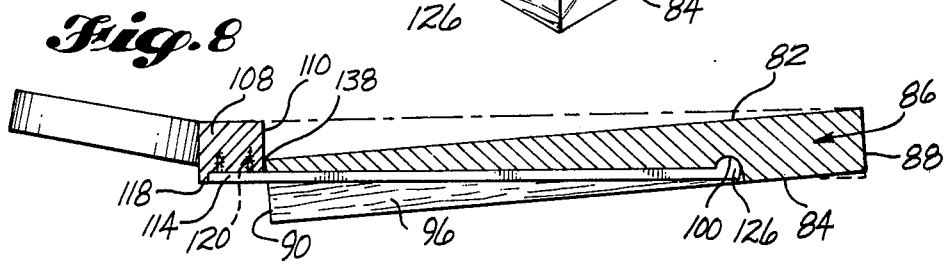
FIG. 8 is a cross-sectional view of the embodiment shown in FIG. 7, illustrating the operation of the pivot when the board is lifted by the handle from a supporting surface.
Figure 9:
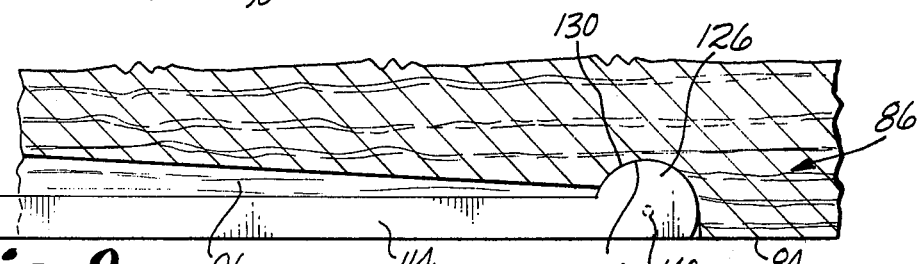
FIG. 9 is an enlarged partially cross-sectional view illustrating a pivot in the embodiment shown in FIGS. 7 and 8.

In FIGS. 7–9, another embodiment of the invention is illustrated. Here, a cutting board 10A is of the same general configuration as the board 10. The board 10A has a cutting board portion 80 having an upper surface 82 and a lower surface 84 with a wall 86 therebetween. There are an outer or remote end 88 and an inner or adjacent end 90. Extending inwardly from the adjacent end 90 are parallel channel-shaped recesses 96 and 98. At the adjacent end, recesses 96 and 98 have their greatest depth, and as they extend remotely toward the end 88, the depths become shallow and terminate in a pair of concave pivot recesses 100 and 102, respectively. The inner surfaces of the recesses 96, 98 are in straight lines.

In this embodiment, a handle 106 is directly connected to a transverse block 108 having a face 110 spaced from the adjacent end face 90 when the board is supported on a generally horizontal table on which the cutting operation is to be performed.

Elongated rod members 114 and 116 are secured in slots in bottom surface 118 of the transverse block 108 by means of flat headed screws 120, the rod members 114 and 116 being flush with the bottom surface 118 and adapted to be flush with the bottom surface 84 when the cutting board is supported on a flat table surface.

Pivots 126 and 128, at the end of the rods 114 and 116, have convex surfaces 130 and 132, respectively, that are complementary to the surfaces 100 and 102 so as to be rotatable therein when the board is lifted by the handle off a flat surface and the weight of the board portion 80 causes it to rotate downwardly with respect to the rods 114 and 116. When this occurs the upper surfaces of the recesses make straight line contact with the rods and the surface 90 makes contact at its upper edge 138 with the surface of the fence wall 110. As indicated in FIG. 8, cut material that would be on the board surface 82 would be stopped by the fence wall 110 and be in position for scraping or funneling from the upper surface 82 into a container by tilting the entire structure with the handle.

There is enough surface contact between the rods, pivots and their recesses to retain the board and the rods together, and in addition, when the board is lowered, the additional contact of the upper recess surfaces on the rods further secure the board 80 and rods during a funneling or otherwise discharging operation of the cut material. If more positive holding connection is desired between the pivots and the board 80, a central pivot pin 140, as shown in FIG. 9, can be inserted through the board and both pivots.

Figure 10:
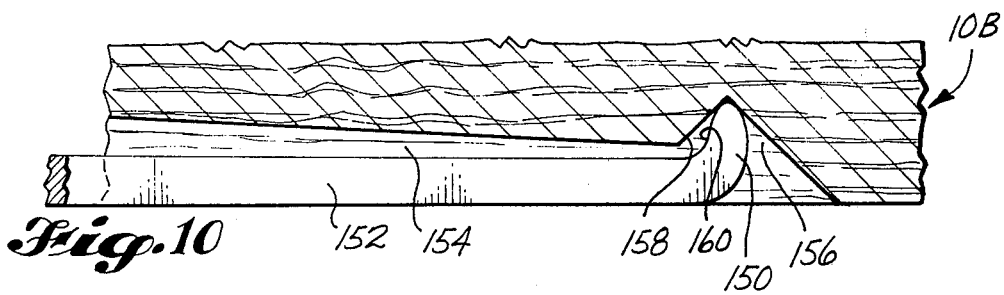
FIG. 10 is an enlarged fragmentary view of another embodiment of a pivot for a chopping board according to the invention.

In FIG. 10 a cutting board 10B is shown fragmentarily. Here, the board is substantially the same as the board 10A, except that it has a different type pivot 150 on a pair of spaced rods 152 in spaced recesses 154. The recesses are cut identically with those as 96 and 98, in FIGS. 7 and 8, for the rods but here the pivot recesses 156 are formed to have surfaces at substantial right angles. The pivots are in the form of an upwardly extending, generally pointed configuration with the point fitting into the substantial right angle portion. When the board is lowered as indicated in FIGS. 7-9, the upper surfaces of the recesses 154 move onto the upper surfaces of the rods 152 and the forward leg 158 of the right angle moves into contact with the forward surface of the pivot at 160. The pivot recesses as well as the rod recesses are routed out to be generally slot-shaped or molded to have the same shape. The sidewalls easily hold the pivot and rods in place for a funneling discharge of cut material.

Figure 11:
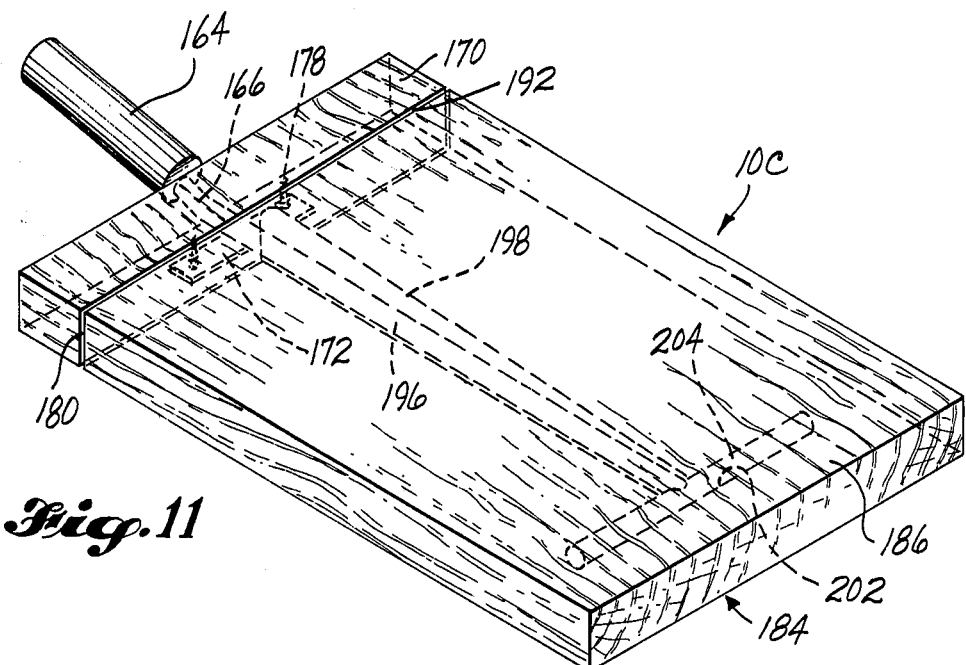
FIG. 11 is an isometric view illustrating still another embodiment of the invention.
Figure 12:
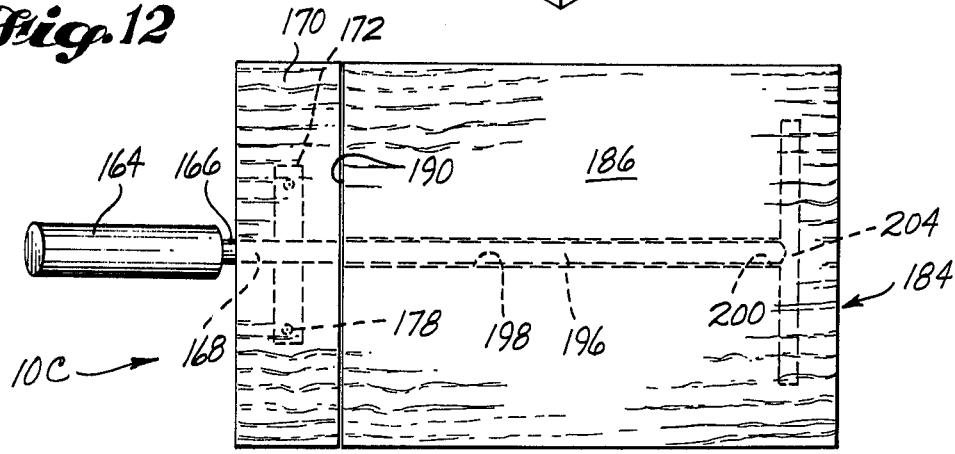
FIG. 12 is a plan view of the embodiment shown in FIG. 11.
Figure 13:
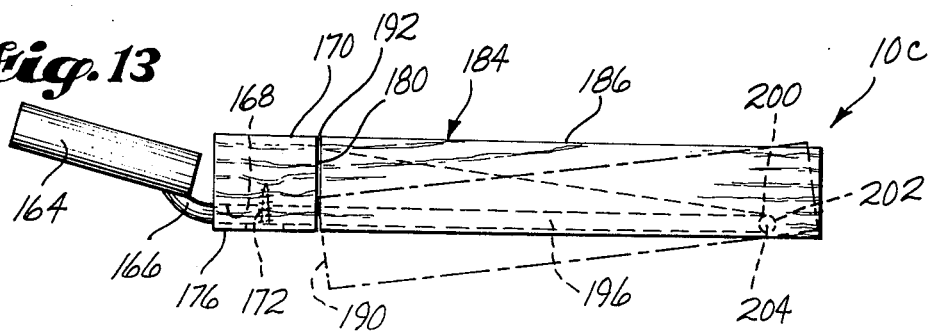
FIG. 13 is a side view of the embodiment shown FIG. 12.

In FIGS. 11-13, still another embodiment of the invention is shown in the form of a cutting board 10C. The board has a handle 164 fitted on a rod 166 extending into a groove 168 in a tranverse, generally rectangular block 170. The rod 166 and handle are secured in the groove 168 and to the block by a strip 172 welded to the rod and recessed in a transverse groove in bottom surface 176 of the block. The strip is secured to the block by flat-headed screws 178, the rod 166 extending inwardly through the block fence-forming wall 180.

Cutting board portion 184 is generally rectangular and has an upper cutting surface 186, an opposite under surface 188, a transverse surface 190 adjacent to the wall 180 of the block, and an edge 192 joining the surfaces 186 and 190.

This board is distinguished from the prior embodiments by having only a single rod 196, an extension of rod 166, fitted in a single varying depth groove 198. The groove 198 has its greatest depth at the adjacent edge surface 190 and terminates at its shallow end 200 in a transverse groove 202. Fitted for rotation in the groove 202 is a transverse pivot rod 204, connected to the end of the rod 196. The connection may be threaded or welded, for example.

In operation after cutting is completed, the board is lifted by the handle 164, the cutting portion 184 being lowered on the rod 196 so that the rod moves into contact with the upper surface of the groove 198 as the pivot rod 204 rotates in the groove 202. As the portion 184 is lowered, edge 192 is stopped against the fence wall 180 to permit easy funneling or scraping of the cut material from the board, FIG. 13.

The depth of the groove 198 and the arrangement of the pivot rod 204 in the groove 202 holds the cutting portion 184 on the rods during any ordinary tilting by the handle for funneling. Keepers such as 64, FIG. 5, could be employed to further secure the cutting portion 184 to the rods, if necessary.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. In a cutting board,
   an upper board surface for cutting material thereon;
   an opposite lower board surface on which the board is adapted to be supported during cutting;
   said upper and lower surfaces being spaced;
   a handle connected to and operative to lift said board;
   the improvement comprising;
   means connecting said handle to said board; and
   means within said board to permit an end of the board adjacent the handle to be lowered with respect to said handle and to be lowered on and with respect to said means connecting when said board is lifted by said handle.

2. The invention according to claim 1 in which:
   said means connecting having means remote from said handle for supporting an end of said board remote from said handle, substantially at the level of said handle when the board is lifted by said handle.

3. The invention according to claim 1 in which:
   said means connecting having pivot means remote from said handle for pivotally supporting a remote end of said board substantially at the level of said handle when the board is lifted by the handle.

4. The invention according to claim 1 including:
   means extending from said handle between the handle and the adjacent end of the board, having a wall end surface spaced from and facing a wall end surface on said adjacent end; and
   said wall end surfaces making contact when said adjacent end of the board is lowered.

5. The invention according to claim 4 in which:
   said contact of said wall end surfaces being with an upper edge of said adjacent end of said board and a lower face portion of said wall end surface of said means extending from said handle;
   a substantial part of said last wall end surface extending above and being exposed to said upper surface of said board when it is lowered so that said last wall end surface forms a fence to aid in scraping cut material off the board and into a container.

6. The invention according to claim 1 in which:
   said means connecting include a pair of spaced elongated members extending along a lower portion of said board when said board is supported on its lower surface;

said means connecting having pivots at ends thereof remote from said handle and from said adjacent end of said board.

7. The invention according to claim 6 in which:
said means within said board include recessed portions extending inwardly from said lower surface toward said upper surface and starting at said adjacent end to receive said elongated members and said pivots.

8. The invention according to claim 7 in which:
said recessed portions for receiving said members having varying depths inwardly from said lower surface;
said depths being the greatest at said adjacent end and decreasing therefrom to the recesses receiving the pivots;
said pivot recesses having depths relative to the pivot size, and when the board is lifted by the handle, the board rotates on the pivots and the elongated members come to rest in the recessed portions so that the members extend along said varying depths, and the adjacent end has been lowered with respect to said members the amount of said greatest depths.

9. The invention according to claim 8 in which:
said pivots and their respective recesses are complementary.

10. The invention according to claim 8 in which:
each of said members is generally rod-shaped and has an upwardly pointed pivot on its end.

11. The invention according to claim 8 in which:
each of said members is generally rod-shaped and has an upwardly extending convex pivot extending into a concave pivot recess.

12. The invention according to claim 1 in which:
said means connecting include a pair of spaced elongated members extending along a lower portion of said board when said board is supported on its lower surface;
said means connecting having pivot means remote from said handle and from said adjacent end of said board;
said means within said board including recessed portions extending inwardly from said lower surface toward said upper surface and starting at said adjacent end to receive said elongated members and said pivot means;
said recessed portions for receiving said members having varying depths inwardly from said lower surface;
said depths being the greatest at said adjacent end and decreasing therefrom to the portions receiving the pivot means;
said pivot portions having depths relative to the pivot means size and when the board is lifted by the handle, the board rotates on the pivot means and the elongated members come to rest in the recessed portions for receiving said members so that the members extend along said varying depths and the adjacent end has been lowered with respect to said members the amount of said greatest depths;
each of said members being generally rod-shaped; and
at least one of said members has pivot means remote from said adjacent end and extending transversely with respect to said members;
said pivot portions extending transversely with respect to said recessed portions for receiving said members.

13. The invention according to claim 12 in which:
said pivot means is generally rod-shaped.

14. The invention according to claim 13 including:
a keeper secured to said lower surface and extending over said pivot means to secure said pivot means in said pivot recess portion.

15. The invention according to claim 14 in which:
said recessed portions are generally slot-shaped.

16. The invention according to claim 9 in which:
said recessed portions are generally slot-shaped.

17. The invention according to claim 12 including:
means inwardly of the handle, between the handle and the adjacent end of the board, having a wall end surface spaced from and facing a wall end surface on said adjacent end;
said wall end surfaces making contact when said adjacent end of the board is lowered;
said contact of said wall end surfaces being with an upper edge of said adjacent end of said board and a lower face portion of said wall end surface of said means inwardly of the handle; and
a substantial part of said last wall end surface extending above and being exposed to said upper surface of said board when it is lowered, so that said last wall end surface forms a fence to aid in scraping cut material off the board and into a container.

18. The invention according to claim 1 in which:
said means connecting include an elongated member extending along a lower portion of said board when said board is supported on its lower surface;
said means connecting having a pivot at an end thereof remote from said handle and from said adjacent end of said board.

19. The invention according to claim 18 in which:
said means within said board include recessed portions extending inwardly from said lower surface toward said upper surface and starting at said adjacent end to receive said elongated member and said pivot.

20. The invention according to claim 19 in which:
said recessed portion for receiving said member having varying depths inwardly from said lower surface;
said depths being the greatest at said adjacent end and decreasing therefrom to the recess receiving the pivot;
said pivot recess having depth relative to the pivot size, and when the board is lifted by the handle, the board rotates on the pivot and the elongated member comes to rest in the recessed portion so that the member extends along said varying depths, and the adjacent end has been lowered with respect to said member the amount of said greatest depth.

21. The invention according to claim 20 in which:
said pivot and its recess are complementary.

22. The invention according to claim 20 in which:
said member is generally rod-shaped and has a transverse rod-shaped pivot on its end forming the bar of a T on the member.

23. The invention according to claim 22 in which:
said recessed portions are generally slot-shaped.

24. The invention according to claim 23 including:
means inwardly of the handle, between the handle and the adjacent end of the board, having a wall end surface spaced from and facing a wall end surface on said adjacent end;
said wall end surfaces making contact when said adjacent end of the board is lowered;

said contact of said wall end surfaces being with an upper edge of said adjacent end of said board and a lower face portion of said wall end surface of said means inwardly of the handle; and a substantial part of said last wall end surface extending above and being exposed to said upper surface of said board when it is lowered, so that said last wall end surface forms a fence to aid in scraping cut material off the board and into a container.

* * * * *